United States Patent Office 2,883,334
Patented Apr. 21, 1959

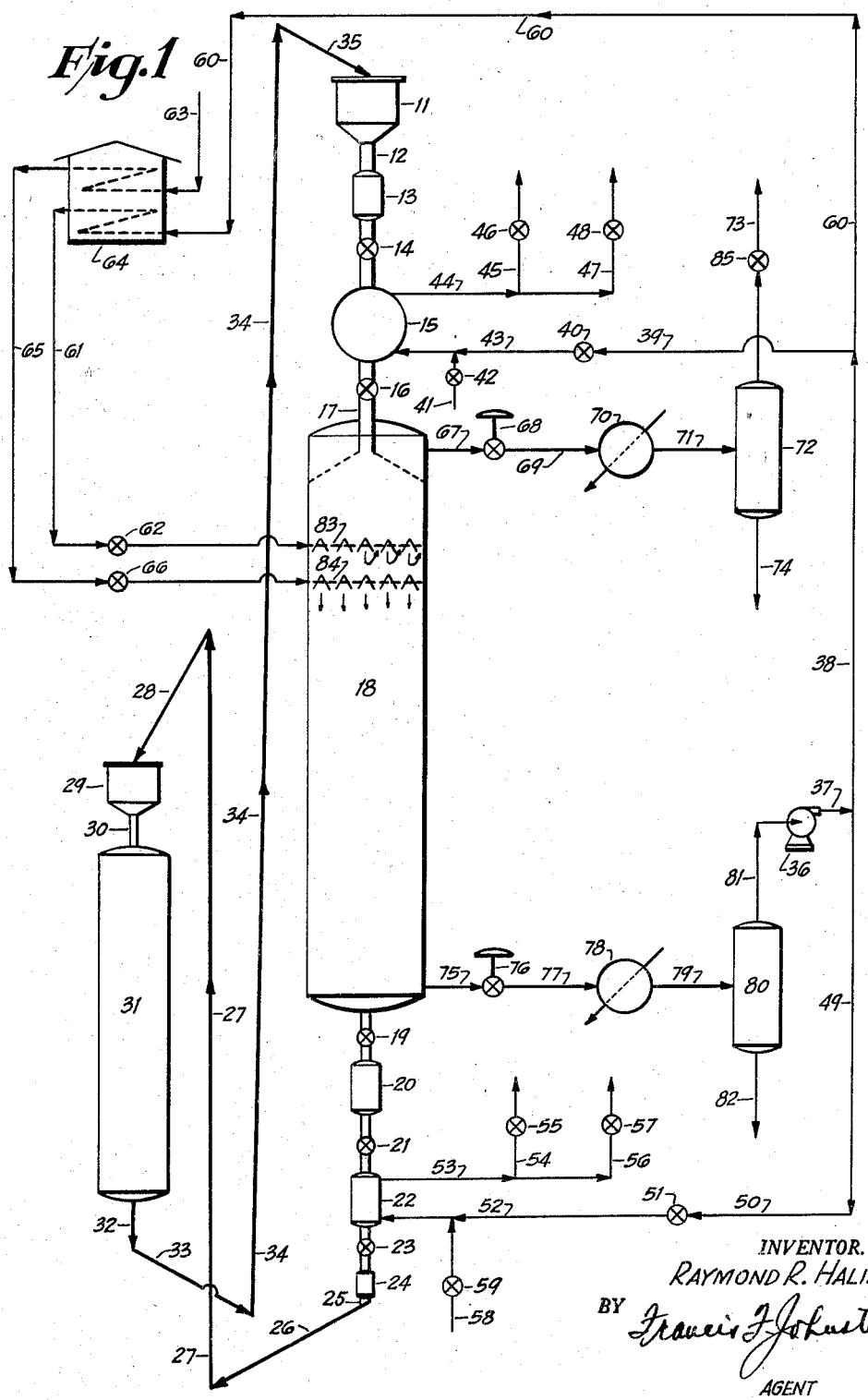

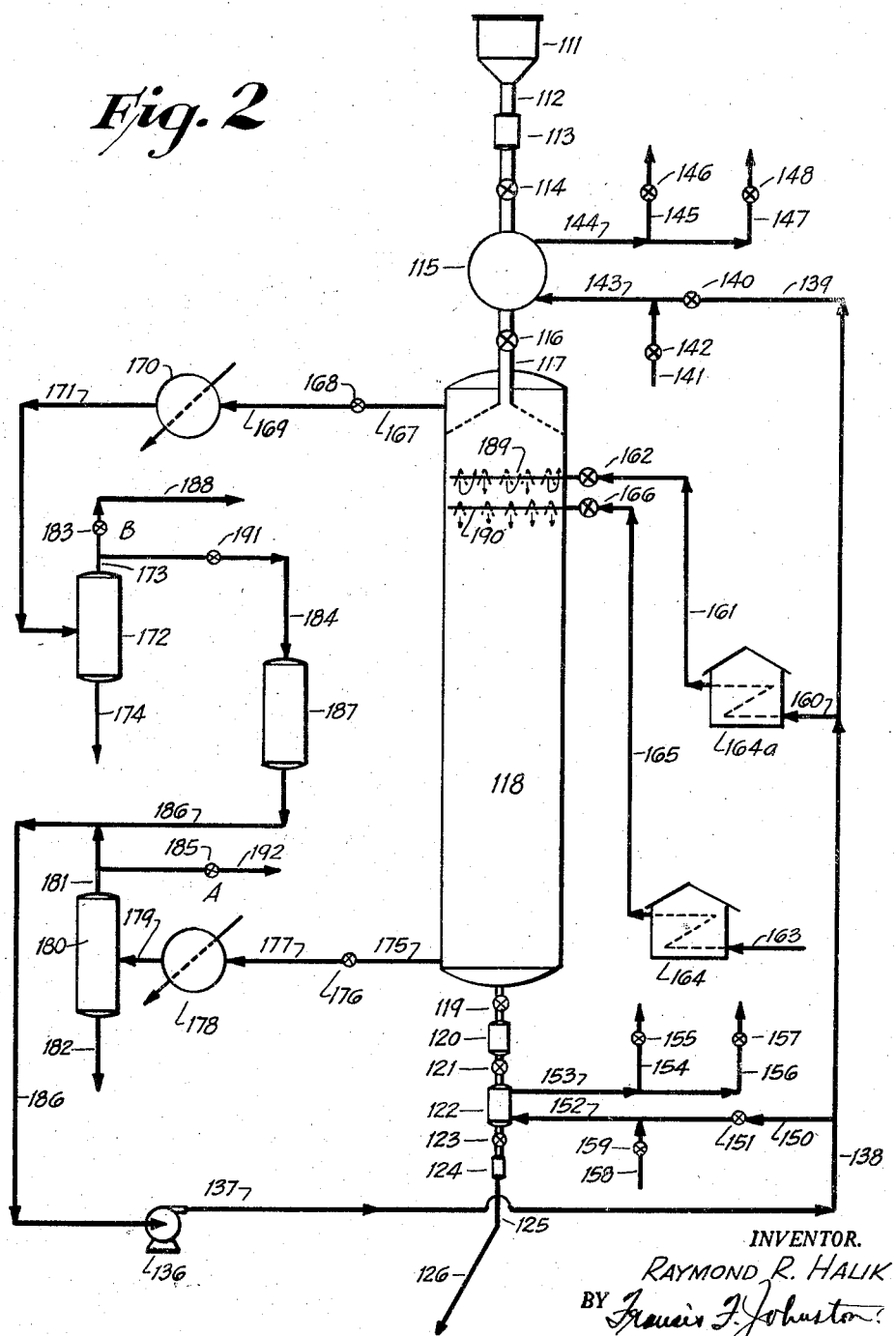

2,883,334

CATALYST MOISTURE CONTROL

Raymond R. Halik, Oak Ridge, Tenn., assignor to Socony Mobil Oil Company, Incorporated, a corporation of New York Application August 15, 1952, Serial No. 304,486

5 Claims. (Cl. 208—150)

The present invention relates to catalytic reforming and, more particularly, to the removal of water and/or loosely bound oxygen from the catalyst.

As used in the art, the term "reforming" encompasses those molecular changes which individually are known as dehydrogenation, isomerization, and dehydro-aromatization. In a reforming operation, one or all of the aforementioned molecular changes can take place individually or in series depending upon the catalyst employed and the reaction conditions. Accordingly, as used herein, the term, "reforming," will be used to include each of the afor mentioned molecular changes per se, or any two, or all three.

The catalyst can be any suitable solid catalyst in particle form. In the contemplated reforming reactions, the solid reforming catalyst in particle form passes through a reactor as a substantially compact stream under reforming conditions of temperature and pressure. During its passage through the reactor, the catalyst is contacted with a hydrocarbon reactant which can be a single hydrocarbon capable of undergoing any one, or all, of the molecular changes known as isomerization, dehydrogenation, and dehydro-aromatization or dehydrocyclization. As a result of the aforesaid contact of the aforesaid reactant under reforming conditions of temperature, pressure, and space velocity, the reactant is reformed and a carbonaceous contaminant deposited upon the catalyst. The aforesaid carbonaceous contaminant is known as "coke."

For reasons of economy, it is necessary to remove the coke laid down upon the catalyst particles during passage through the reactor. To remove the coke, the catalyst is removed from the reactor and the coke deposited thereon burned off in a combustion supporting stream of gas such as air. Combustion of the coke results in a regenerated catalyst capable of further use in reforming a hydrocarbon reactant. Therefore, the regenerated catalyst is returned to the reactor for passage therethrough as a substantially compact column of solid particles.

While the reactant can be the sole vaporous material introduced into the reactant, it is also desirable to introduce a gaseous heat carrier such as a recycle gas. The recycle gas can be either hydrogen or a hydrogen containing gas comprising at least about 25 percent hydrogen, preferably about 35 to about 60 percent hydrogen, and the balance $C_1$ to $C_6$ hydrocarbons, or a gas containing less than about 25 percent hydrogen or substantially no hydrogen.

Experience with many reforming catalysts has taught those skilled in the art that many reforming catalysts such as a reforming catalyst comprising at least 70 mol percent alumina and the balance chromia, preferably about 18 to about 22 percent chromia, although the coke deposit has been reduced to a practical minimum, fail to yield optimum quantities of conversion products with respect to the stock charged and the reforming conditions existing in the reactors.

It has been suggested that, when a catalyst is in the active condition, i.e., fresh or recently regenerated, optimum yields of reformate for the catalyst and the reforming conditions can be obtained when the catalyst, before contact with the hydrocarbon reactant, is treated with hydrogen. The explanation offered for the improved yields of reformate, i.e., products of a reforming process, when using such catalysts as are subject to hydrogen pre-treatment is that the fresh or regenerated catalyst contains water or loosely bound oxygen which if not removed before contact with the reactant adversely affects the yield of reformate.

Treatment with hydrogen requires a separate pre-treatment step followed by discarding the treating gas. On the other hand, it has been discovered that treatment of the catalyst with a small portion of the recycle gas equivalent to the net make gas will achieve the same ends.

Thus, for example, in a con-current flow reactor, it has been the practice to introduce the hydrocarbon reactant and the recycle gas in admixture and to dry the total recycle gas. However, in accordance with the principles of the present invention, the recycle gas and the hydrocarbon reactant are introduced into the reactor separately and conditions controlled so that only a portion of the recycle gas, preferably equivalent in quantity to the net gas make during the reaction, is contacted with the catalyst containing sufficient water to adversely affect the yield of reformate before the catalyst contacts the hydrocarbon reactant and the balance of the recycle gas.

Illustrative of the conditions under which reforming takes place is that of a straight run naphtha which contains hydrocarbons capable of undergoing the molecular changes known as isomerization, dehydrogenation and dehydrocyclization in the presence of a reforming catalyst comprising at least 70 mol percent alumina and 18–30 mol percent chromia. The reaction temperature is about 800° to about 1300° F. and preferably about 900° to about 1050° F., the reaction pressure is about 15 to about 600 p.s.i.a. and preferably about 100 to about 300 p.s.i.a. The conversion is carried out in the presence of about 1 to about 15, preferably about 4 to about 10, moles of recycle gas or about 1 to about 8, preferably about 2 to about 5, mols of hydrogen per mol of naphtha, the average molecular weight of the naphtha being determined in the usual manner from the A.S.T.M. distillation curve. In general, a space velocity of about 0.2 to about 4.0, preferably about 0.4 to about 2.0, volumes of liquid naphtha per volume of catalyst per hour is employed. The catalyst, after deposition of the deactivating coke, is regenerated by burning off the coke in a stream of combustion-supporting gas, such as air, in a kiln or regenerator at a temperature below the catalyst damaging temperature, for example: at a temperature of about 600° to about 1400° F. and preferably at about 700° to about 1100° F. at a pressure of about 15 to about 600 p.s.i.a.

It is an object of the present invention to provide a method of improving the yield of reformate by contacting the active catalyst carrying water and/or loosely bound oxygen with all or a portion of the light gases generally removed from the system. It is another object of the present invention to provide a method of improving the yield of reformate by contacting active catalyst containing water and/or loosely bound oxygen in excess of that concentration at which the yield of reformate is not adversely affected with all or a portion of the net gas make produced in a reactor wherein said catalyst subsequently contacts a hydrocarbon reactant. It is a further object of the present invention to provide a method of improving the yield of reformate by contacting the active catalyst containing water and/or loosely bound oxygen in excess of that concentration at which the yield of reformate is not adversely affected with all or a portion of the net gas make produced in a reactor wherein said catalyst subsequently contacts a hydrocarbon reactant and discarding said gas after contact with said active catalyst. Other objects and advantages will become apparent from the following description taken in conjunction with the drawings in which:

Figure 1 is a schematic flow sheet illustrative of the application of the principles of the present invention; and Figure 2 is a schematic flow sheet illustrative of the application of the principles of the present invention wherein alternative means for controlling the discard of all or a portion of the net gas make is provided.

In a typical reforming operation, the net gas make represents about 5 to about 25 percent of the total recycle gas fed to the reactor. Since it is advantageous to dry the recycle gas to a dew point of about 60° F., it is manifest that the requirements for drying will be substantially less if (1) the water is removed from the catalyst by all or a part of the net gas make, or (2) if all or a portion of the net gas make only if dried. Consequently, a means by which the water and/or loosely bound oxygen is removed from the catalyst by only a small portion of the recycle gas is attractive from the standpoint of economical operation.

Referring now to Figure 1, which is a schematic flow sheet illustrative of the principles of the present invention, the flow of catalyst through the reactor and kiln will be followed and then the passage of gas and reactant through the reactor will be traced.

Active catalyst is accumulated in hopper or bin 11 and flows through conduit 12 into surge bin 13. Since the reactor preferably operates at a pressure in excess of atmospheric, say 15 to 600 p.s.i.a., preferably 100 to 300 p.s.i.a., it is necessary to interpose between the surge bin or other zone of given pressure and the reactor or zone at higher pressure, a reactor-sealing and catalyst transfer means of a type suitable for transferring particle form solid catalyst from a zone of given pressure to a zone of higher pressure. The reactor-sealing and transfer means illustrated in Figure 1 is a pressuring lock comprising gas-tight valves 14 and 16 and pressuring chamber or pot 15.

The reactor-sealing and catalyst transfer means operates in a cyclic manner as follows: With gas-tight valve 16 closed, catalyst flows from surge bin 13 through gas-tight valve 14 into pressuring chamber 15. When pressuring chamber 15 is filled to a pre-determined level with catalyst, gas-tight valve 14 is closed. The catalyst and chamber are then purged with an inert and/or non-flammable gas such as flue gas. With valve 40 closed, the purge gas drawn from a source not shown through pipe 41 under control of valve 42 is passed through pipe 43 into pressuring pot 15 and vented therefrom through pipes 44 and 45 with valve 48 closed and valve 46 open. After purging the catalyst and chamber 15, a suitable pressuring gas such as recycle gas under pressure provided by compressor 36 is pumped through lines 37, 38, 39, and 43 under control of valve 40 into chamber 15 with valves 46 and 48 closed. When the pressure in chamber 15 is at least equal to or somewhat higher, say 5 or 10 p.s.i. higher, than the pressure in reactor 18, gas-tight valve 16 is opened and the catalyst flows into reactor 18 through conduit 17. Gas-tight valve 16 is closed and valve 48 opened and the residual pressuring gas in chamber 15 vented. When the pressure in chamber 15 has been reduced to atmospheric, valve 48 is closed and pressuring chamber 15 is purged with inert and/or non-flammable gas drawn through pipes 41 and 43 under control of valve 42 and vented through pipes 44 and 45 under control of valve 46. This completes a cycle.

The catalyst flows downwardly as a substantially compact column through reactor 18 meeting first the recycle gas introduced through pipe 61 and then the hydrocarbon reactant, naphtha, introduced through line 65. During its passage through the reactor, a carbonaceous contaminating deposit is laid down on the particles of catalyst and the activity of the catalyst is thereby reduced. The deactivated catalyst flows from the reactor through catalyst flow control device 19 of any suitable type such as a throttle valve into surge bin 20. From surge bin 20, the catalyst flows into a reactor-sealing and catalyst transfer means of any suitable type whereby solid particles can be transferred from a zone of given pressure (surge bin 20) to a zone of lower pressure (surge bin 24). The reactor-sealing and catalyst transfer means illustrated is a depressuring lock comprising gas-tight valves 21 and 23 and the interposed depressuring chamber 22.

This reactor-sealing and catalyst transfer means operates in a cyclic manner as follows: With gas-tight valves 21 and 23 closed and valves 55, 57, and 59 closed, valve 51 is opened and a suitable gas such as recycle gas is pumped by compressor 36 through pipes 37, 49, 50, and 52 into depressuring chamber 22 until the pressure therein is at least equal to that of reactor 18 and surge bin 20. Gas-tight valve 21 is opened and depressuring chamber 22 filled with catalyst to a predetermined level. Gas-tight valve 21 then is closed and the pressure in chamber 22 reduced to that of kiln 31 by venting the gas from chamber 22 through pipes 53 and 56 under control of valve 57. When the pressure in chamber 22 has been reduced to that of kiln 31, the chamber and the contents thereof are purged with an inert and/or non-flammable gas such as flue gas drawn from a source not shown through pipe 58 under control of valve 59 with valve 51 closed and passed through pipe 52 into chamber 22. The purge gas is vented through pipes 53 and 54 under control of valve 55 with valve 57 closed. After purging chamber 22, gas-tight valve 23 is opened and the catalyst flows into surge bin 24. When all or a predetermined amount of the catalyst has flown out of chamber 22, the gas-tight valve 23 is closed. This completes the cycle.

The catalyst flows from surge bin 24 through conduit 25 through chute 26 to a catalyst transfer means 27 of any suitable type whereby the deactivated catalyst can be transferred to kiln or regenerator 31. The catalyst transfer means illustrated in Figure 1 is a bucket elevator of a type known to those skilled in the art, although gas lifts and the like can be used.

The catalyst is transferred by means of catalyst transfer means 27 from chute 26 to conduit 28 through which it flows to kiln feed hopper or bin 29. The deactivated catalyst flows from bin 29 through conduit 30 into kiln 31 which can be of any suitable type wherein the carbonaceous contaminant on the catalyst can be burned off in a stream of combustion supporting gas at a temperature of about 600° to about 1400° F., preferably at about 700° to about 1100° F. and at a pressure of about 15 to about 600 p.s.i.a.

The catalyst flows downwardly as a substantially compact column through kiln 31. During the passage therethrough at least a portion or substantially all of the coke is burned off and the catalyst reactivated. The reactivated catalyst flows through conduit 32 and chute 33 to catalyst transfer means 34 which is of any suitable type such as a gas-lift or the like, an elevator, etc., whereby the reactivated catalyst is transferred to reactor feed bin 11. As illustrated in Figure 1, the catalyst transfer means is a bucket elevator. The catalyst flows along chute 33, is picked up by elevator 34 and discharged into chute 35 along which it flows to reactor feed bin 11 ready for another cycle through the reactor and kiln.

Returning now to trace the course of the vapors and gases through the reactor, it is to be noted that about 10 to about 15 percent of the total gas issuing from reactor 18 is the net increase of gas resulting from consumption of gas introduced into reactor 18 and gas produced in reactor 18. It will also be noted that it is preferred to employ about 1 to about 15 mols, preferably about 4 to 10 mols of recycle gas or about 1 to about 8, preferably about 2 to about 5, mols of hydrogen per mol of hydrocarbon reactant.

Accordingly, recycle gas pumped by compressor 36 through pipes 37, 38, and 60 is heated in furnace 64 in amount such that at the aforesaid recycle ratio and at the pre-determined temperature when mixed with the heated vapors of the hydrocarbon reactant in reactor 18, the reforming temperature will be maintained. In general, the recycle gas is heated to about 1100° to about 1300° F. in furnace 64, passed through pipe 61 under control of valve 62 and introduced into reactor 18 at a point sufficiently closer to the catalyst inlet to the reactor than to the hydrocarbon inlet that the catalyst after contact with a portion of the recycle gas will have a water and/or loosely bound oxygen content sufficiently low to not decrease the yield of reformate under the reforming conditions existent in the reactor.

The hydrocarbon reactant, for example: a naphtha containing hydrocarbons capable of undergoing at least one of the molecular changes of isomerization, dehydrogenation, and dehydrocyclization is drawn from a source not shown through line 63 and is heated in furnace 64 to a temperature of about 600° to about 1100° F., preferably about 750° to about 1060° F. The heated hydrocarbon reactant passes through line 65 under control of valve 66 to reactor 18 which the heated vapors of the hydrocarbon reactant enter at a point sufficiently further removed from the catalyst inlet that the catalyst when it reaches the hydrocarbon reactant inlet is devoid of or contains less than that amount of water and/or loosely bound oxygen detrimental to optimum yields of reformate under the existing reforming conditions from the hydrocarbon being treated.

While several means, each, can be used to control the amount of recycle gas which passes upward from the recycle gas inlet, it is presently preferred to achieve such control by means of throttling means such as throttle valves on the effluent streams. Such throttling means are indicated as valves 68 in pipe 67 and valve 76 in line 75. Accordingly, throttle valve 68 is set to pass that portion of the recycle gas equal to all or a portion of the net make gas necessary to condition the catalyst before it contacts the hydrocarbon reactant while throttle valve 76 is set to pass the balance of the recycle gas, the net make gas, and substantially all of the vapors of the reformate. Thus, in a typical reforming operation when the total recycle gas charge is about 7000 to about 9000 standard cubic feet per hour (s.c.f.h.), the make gas amounts to about 800 to about 1500 s.c.f.h. or about 11 to about 17 percent of the total recycle gas fed to the reactor. Accordingly, when this relation between total recycle gas and gas make prevails, throttle valve 68 is set to pass up to 17 percent, say about 10 to about 16 percent of the recycle gas introduced into reactor 18 at recycle gas inlet 83, while throttle valve 76 is set to pass substantially all of the reformate, all of the net make gas, and the balance of the recycle gas. However, under other conditions of severity of reforming, throttle valve 68 is set to pass about 5 to about 20 percent of the recycle gas introduced into reactor 18. In order to insure that the hydrocarbon reactant passes downwardly concurrent with the catalyst, a pressure differential is maintained between line 75 and pipe 67 somewhat in excess of the equivalent of the back pressure of the column of catalyst between hydrocarbon inlet 84 and line 75. The throttle and pressure differential control means are represented in Figure 1 by valves 68 and 76. The pressure differential between distributor 83 and effluent line 75 is always greater than the pressure differential between distributor 84 and effluent line 75. The pressure differential between effluent line 67 and effluent line 75 generally, but not necessarily always, is greater than the pressure differential between distributor 84 and effluent line 75.

Accordingly, with valve 68 set to pass, say all or a portion of the net make gas and substantially none of the hydrocarbon reactant or reformate and valve 76 set to pass the balance of the vapors passing through reactor 18, the predetermined quantity of recycle gas passes upwardly from inlet 83 through the catalyst and in such passage removes water and/or loosely bound oxygen which appears in the effluent passing through pipes 67 and 69 to cooler or condenser 70 as water. The effluent from condenser 70 passes through pipe 71 into separator 72 wherein such hydrocarbons condensing at about 125° F. and higher are separated and the non-condensed gases together with water removed from the catalyst is vented through pipe 73 under control of valve 85. Any liquid which separates in separator 72 is withdrawn through line 74.

Due to the pressure differential between outlets 67 and 75, substantially all of the hydrocarbon reactant together with the balance of the recycle gas flows downwardly concurrent with the active catalyst which has been conditioned before contacting the hydrocarbon reactant by treatment with the portion of the recycle gas flowing upwardly counter-current to the catalyst.

Substantially all of the hydrocarbon reactant, the reformate produced therefrom, the balance of the recycle gas, and the net make gas pass from reactor 18 through line 75 under control of valve 76 and through line 77 to condenser 78. The effluent from condenser 78 passes through line 79 into liquid-gas separator 80 where the reformate and hydrocarbons boiling above about 125° F. separate as a liquid which is withdrawn to fractionating means and storage and/or distribution through line 82 and the gas for recycle leaves separator 80 through pipe 81.

Since the catalyst was conditioned before contact with the hydrocarbon reactant, the gas from separator 80 has a dew point such that drying thereof is usually unnecessary. Accordingly, the gas passes from separator 81 to compressor 36 and is then pumped back to the reactor and for use as a pressuring and depressuring gas. Thus, by conditioning the catalyst with a portion of the recycle gas, it is unnecessary to dry all of the recycle gas and in addition the yield of reformate from a given stock is maintained at a maximum for a given set of reforming conditions. In addition, in place of hydrogen from an extraneous source as a conditioner for the catalyst, gas produced in the reaction is used.

Referring now to Figure 2. Active catalyst in reactor feed hopper 111 flows through conduit 112 into surge bin 113. A reactor-sealing and solid-particle transfer means of any type suitable for transferring solid particles from a zone of given pressure to a zone of higher pressure is interposed between surge bin 113 and reactor 118. Such a reactor-sealing and solid particle transfer means can be a pressure lock such as provided by gas-tight valves 114 and 116 and intermediate vessel or chamber 115. The pressure lock operates in a cyclic-manner as described in conjunction with Figure 1. Thus, gas-tight valve 116 is closed and gas-tight valve 114 opened. Catalyst flows from surge bin 113 into pressurizing chamber 115 until chamber 115 is filled to a predetermined level. Then chamber 115 and the contents thereof are purged with an inert and/or non-flammable gas such as flue gas drawn from a source not shown through pipes 141 and 143 with valve 142 open and valve 140 closed. The purge is vented through pipes 144 and 145 with valve 146 open and valve 148 closed. After purging, a suitable pressuring gas, such as recycle gas, is pumped by compressor 136 through pipes 137, 138, 139, and 143 with valve 140 open and valves 142, 146, and 148 closed until the pressure in chamber 115 is at least as high as that of reactor 118 and preferably somewhat higher, say about 5 p.s.i. Gas-tight valve 116 is then opened and the catalyst therein flows into reactor 118 through conduit 117. The residual gas in chamber 115 is then vented through pipes 144 and 147 with valve 148 open and valve 146 closed. This completes the cycle.

The catalyst flows downwardly through reactor 118 as a substantially compact column. In the upper portion of reactor 118, i.e., in that portion of reactor 118 between the catalyst inlet and recycle gas inlet 189, the catalyst contacts a portion of the recycle gas equivalent to at least a portion of the net gas make whereby the water and/or loosely bound oxygen of the catalyst is reduced to a concentration which does not adversely affect the yield of reformate.

During its passage through the reactor, the catalyst acquires a deposit or carbonaceous contaminant known as coke and is deactivated. The deactivated catalyst flows out of the reactor through catalyst flow control means, for example: a throttle valve 119 into surge bin 120.

When the reactor is being operated at pressures higher than that of the regenerator or kiln, it is necessary to provide a reactor-sealing and catalyst transfer means whereby the solid particles of catalyst can be transferred from the zone of given pressure (reactor) to a zone of lower pressure. Such a reactor-sealing and catalyst transfer means can take many forms; that illustrated is a depressuring lock comprising gas-tight valves 121 and 123 and the intermediate depressuring chamber or vessel 122. The depressuring lock is operated on a cycle as follows: With gas-tight valves 121 and 123 closed, a suitable pressuring gas, for example, recycle gas, is pumped from compressor 136 through pipes 137, 138, 150, and 152 under control of valve 151 with valves 159, 155, and 157 closed until the pressure in chamber 122 is approximately that of reactor 118 and surge bin 120. Gas-tight valve 121 is then opened and catalyst flows into chamber 122 to a predetermined level. Gas-tight valve is closed and valve 157 opened and the gas in chamber 122 vented through pipes 153 and 156 until the pressure in chamber 122 is approximately that of the regenerator. Valve 157 is then closed and an inert and/or non-flammable purge gas such as flue gas is drawn from a source not shown through pipes 158 and 152 with valve 159 open and valve 151 closed and vented through pipes 153 and 154 with valve 155 open and valve 157 closed. After purging vessel 122 and the contents thereof, gas-tight valve 123 is opened and the catalyst flows into surge bin 124 and thence through conduit 125 into chute 126. This completes the cycle.

The catalyst flows along chute 126 to a suitable catalyst transfer device such as a gas-lift and the like, an elevator or, as shown in Figure 1, a bucket elevator 34. By means of the catalyst transfer device the deactivated catalyst is transferred to a regenerator such as kiln 31 of Figure 1.

A suitable bucket elevator is described in U.S. Patent No. 2,409,596, while a suitable kiln or regenerator is described in U.S. Patent No. 2,469,332.

The deactivated catalyst passes through the kiln or regenerator as a substantially compact column and during that passage the coke is burned-off in a combustion-supporting stream of gas at temperatures of about 600° to about 1400° F. and preferably at about 700° to about 1100° F. The removal of a major portion of the coke reactivates the catalyst which is transferred in any suitable manner from the outlet of the regenerator to reactor feed bin 111 ready to begin another cycle.

The flow of recycle gas and hydrocarbon reactant through the reactor will now be described. Recycle gas compressed to at least the pressure required in the reactor by compressor 136 flows through pipes 137, 138 and 160 to furnace 164a.

In furnace 164a the recycle gas is heated to a temperature such that when mixed with the hydrocarbon reactant in the ratio of about 1 to about 15 preferably about 4 to about 10 mols of recycle gas or about 1 to about 8 preferably about 2 to about 10 mols of hydrogen per mol of hydrocarbon reactant (the average molecular weight of the hydrocarbon reactant being determined in the usual manner from the A.S.T.M. distillation curve) the mixture has a temperature of about 700° to about 1300° preferably about 900° to about 1050° F. In general, the recycle gas is heated to about 1050° to about 1300° F. preferably about 1050 to about 1200° F. The heated recycle gas passes through pipe 161 under control of valve 162 to enter reactor 118 at distributor 189. A portion of the recycle gas equivalent to at least a portion or all of the net make gas flows upwardly from distributor 189 contacting the active catalyst and removing water and/or loosely bound oxygen in excess of that concentration which does not adversely affect the yield of reformate from the hydrocarbon reactant under the reforming conditions existent in the reactor 118. The balance of the recycle gas flows downwardly concurrently with the catalyst from distributor 189 and mixes with the vapors of the heated hydrocarbon reactant introduced into reactor 118 through distributor 190. The means for controlling the distribution of the recycle gas between the upper and lower portion of the catalyst bed will be described hereinafter.

The hydrocarbon reactant to be reformed and comprising either a single hydrocarbon or a mixture of hydrocarbons containing hydrocarbons capable of undergoing one or all of the molecular changes designated, isomerization, dehydrogenation and dehydrocyclization is drawn from a source not shown through line 163 heated in furnace 164 to a temperature below a thermal cracking temperature, for example: about 600° to about 1050° F. and preferably about 750° to about 1000° F. and passed through line 165 under control of valve 166 to distributor 190.

Substantially all of the heated vapors of the hydrocarbon reactant flow downwardly from distributor 190 concurrent with the downwardly flowing substantially compact column of catalyst.

Control of the quantity of recycle gas which flows upwardly from distributor 189 is obtained by means of throttling means such as throttle valves 168 and 176 in effluent lines 167 and 175 respectively. Thus, valve 168 is set to pass a quantity of recycle gas equivalent to all or a portion of the net gas make and valve 176 is set to pass the balance of the gaseous and vaporous contents of the reactor. A pressure differential control means regulates the difference in pressure of lines 167 and 175 so that there is a difference in pressure between line 167 and 175 more than equal to the drop in pressure through the catalyst column below distributor 189. The throttling means and pressure differential control are represented in Figure 2 by valves 168 and 176. The pressure differential between distributor 189 and effluent line 175 is always greater than the pressure differential between distributor 190 and effluent line 175. The pressure differential between effluent line 168 and effluent line 175 generally, but not necessarily always, is greater than the pressure differential between distributor 190 and effluent line 175.

The portion of the recycle gas passed through the catalyst for the purpose of conditioning the same, together with the water initially present and/or produced in the conditioning treatment, is drawn off through line 167 under control of valve 168, passed through line 169 to condenser 170 wherein the constituents of the effluent boiling above about 100° to about 125° F. are condensed. The cooled effluent passes from condenser 170 through line 171 to liquid-gas separator 172. In liquid-gas separator 172 the condensate is withdrawn through line 174 while the uncondensed gases and water removed from the catalyst are vented through line 173. When more recycle gas has passed from distributor 189 to line 167 than is equivalent to the total net make gas, the excess of such recycle gas together with the water carried thereby is vented through pipe 188 under control of valve 183. The balance of the recycle gas is passed through pipe 184 under control of valve 191 to drier 187 which can be of any suitable type and thence through pipe 186 to compressor 136.

The heated vapors of hydrocarbon reactant and the balance of the recycle gas flow downwardly concurrently with the substantially compact column of catalyst and leave the reactor through line 175 under control of valve 176 and pass through line 177, condenser 178 and line 179 to liquid-gas separator 180.

In liquid-gas separator 180 the condensed portion of the reactor effluent is withdrawn through line 182 to further treatment such as fractionation and the like while the uncondensed portion of the reactor effluent is withdrawn through pipe 181 and flows to pipe 186 to mix with the dried recycle gas from separator 172. When an amount of recycle gas equivalent to less than the total net make gas is used for conditioning the catalyst, the difference between the quantity used for the conditioning of the catalyst and the total quantity of net make gas is vented from pipe 181 through pipe 192 under control of valve 185.

The foregoing description of the present invention has been a description of a reforming process wherein a reforming catalyst is employed which is adversely affected by the presence of water and/or loosely bound oxygen in excess of about 0.3 to about 0.7 weight percent and in which improved yields are obtained by contacting the active catalyst containing excessive amounts of water and/or loosely bound oxygen with a quantity of recycle gas at least equivalent to the net make gas whereby at least said excessive amounts of water and/or loosely bound oxygen are removed from the catalyst by said recycle gas before said catalyst contacts the hydrocarbon reactant to be reformed, and an amount of recycle gas containing water derived from the catalyst not in excess of the total quantity of net make gas is discharged from the recycle gas stream whereby the amount of recycle gas to be dried is reduced appreciably. Therefore, the present invention is defined as a method of reforming a hydrocarbon reactant containing at least one hydrocarbon capable of undergoing at least one of the molecular changes designated, isomerization, dehydrogenation and dehydrocyclization in the presence of a reforming catalyst, the conversion capability of which is adversely affected by the presence of water and/or loosely bound oxygen wherein there is a net production of gas from the reaction in which active reforming catalyst is introduced into a reaction zone at a catalyst inlet, flows downwardly through said reaction zone to a catalyst outlet, a hydrocarbon reactant is introduced into said reaction zone at a point intermediate said catalyst inlet and outlet, a recycle gas is introduced into said reaction zone at a point between said hydrocarbon inlet and said catalyst inlet, effluent is withdrawn from said reaction zone at a point in the region of said catalyst inlet and at a point in the region of said catalyst outlet and the volume of effluent leaving said reaction zone through the effluent outlet in the region of said catalyst inlet is controlled to be equal to at least a portion of the net gas make in said reaction.

I claim:

1. A method of reforming hydrocarbons which comprises introducing active particle-form, solid reforming catalyst, conversion in the presence of which is adversely affected by association therewith of a substance selected from class consisting of water and loosely-bound oxygen in excess of about 0.3 to about 0.7 weight percent, into a reforming zone through a reforming zone catalyst inlet, flowing said catalyst as a substantially compact column of particles downwardly through said reforming zone to a reforming zone catalyst outlet, introducing substantially all the hydrocarbon reactant into said reforming zone through a hydrocarbon reactant inlet intermediate said reforming zone catalyst inlet and said reforming zone catalyst outlet, separately introducing substantially all the recycle gas into said reforming zone through a recycle gas inlet intermediate said hydrocarbon reactant inlet and said reforming zone catalyst inlet, contacting said column of particles of catalyst with said hydrocarbon reactant and said recycle gas under reforming conditions of temperature, pressure, and space velocity to produce a net make of hydrogen-containing gas, withdrawing vapors from said reforming zone at a point in the vicinity of said reforming zone catalyst inlet and at a point in the vicinity of said reforming zone catalyst outlet, regulating the volume of vapors withdrawn from said reforming zone in the vicinity of said reforming zone catalyst inlet to a volume about equal to at least a portion of said net make of hydrogen-containing gas and about 5 to about 20 percent of the total volume of recycle gas, said vapors withdrawn from the vicinity of said reforming zone catalyst inlet being substantially devoid of hydrocarbon reactant and reformate vapors and having a concentration of water in excess of that present in said recycle gas, and maintaining said withdrawn vapors separate from said recycle gas.

2. The method as set forth and described in claim 1, wherein the vapors withdrawn from the reforming zone in the vicinity of the reforming zone catalyst inlet are discarded.

3. The method as set forth and described in claim 1, wherein the volume of vapors withdrawn from the reforming zone in the vicinity of the reforming zone catalyst inlet is equal to the total volume of said net make of hydrogen-containing gas.

4. The method as set forth and described in claim 1, wherein the volume of vapors withdrawn from the reforming zone in the vicinity of the reforming zone catalyst inlet is in excess of the total volume of said net make of hydrogen-containing gas, and wherein the portion of the vapors withdrawn from the vicinity of the reforming zone catalyst inlet in excess of the total volume of said net make of hydrogen-containing gas is discharged from the system and the balance of the vapors withdrawn from the vicinity of the reforming zone catalyst inlet about equal to the volume of the total net make of hydrogen-containing gas is dried and introduced into the recycle gas stream.

5. The method as set forth and described in claim 1, wherein the volume of the vapors withdrawn from the reforming zone in the vicinity of the reforming zone catalyst inlet is less than the said net make of hydrogen-containing gas, wherein the vapors withdrawn from the reforming zone in the vicinity of the reforming zone catalyst inlet are discharged from the system, and wherein an amount of hydrogen-containing gas is separated from the vapors withdrawn from the reforming zone in the vicinity of the reforming zone catalyst outlet and discharged from the system to make the total amount of vapors discharged from the system about equal to the total volume of said net make of hydrogen-containing gas.

References Cited in the file of this patent

UNITED STATES PATENTS

| | | |
|---|---|---|
| 2,324,165 | Layng et al. | July 13, 1943 |
| 2,364,453 | Layng et al. | Dec. 5, 1944 |
| 2,419,517 | Eastwood | Apr. 22, 1947 |
| 2,456,715 | Leffer | Dec. 21, 1948 |
| 2,459,096 | Ray | Jan. 11, 1949 |
| 2,490,975 | Mathy | Dec. 13, 1949 |
| 2,758,065 | Halik | Aug. 7, 1956 |
| 2,773,015 | Yoder | Dec. 4, 1956 |

OTHER REFERENCES

Payne et al.: Petroleum Refiner, vol. 31, No. 5, May 1952, pages 117–123.